Dec. 5, 1967   J. V. FOSTER   3,355,934
VIBRATION MEASUREMENT WITH COHERENT LIGHT
Filed April 24, 1967   2 Sheets-Sheet 1
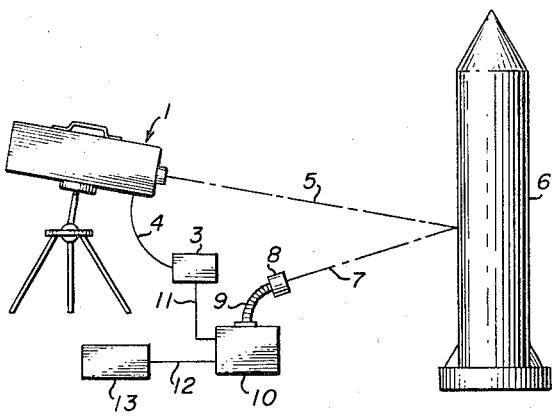
Fig_1
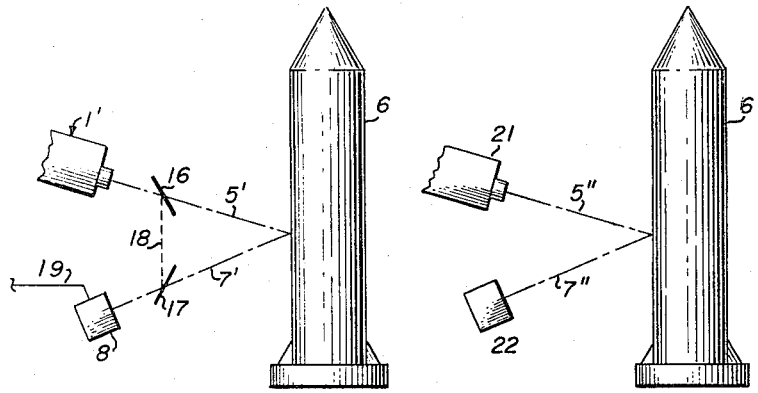
Fig_2   Fig_3
INVENTOR
JOHN V. FOSTER
ATTORNEYS

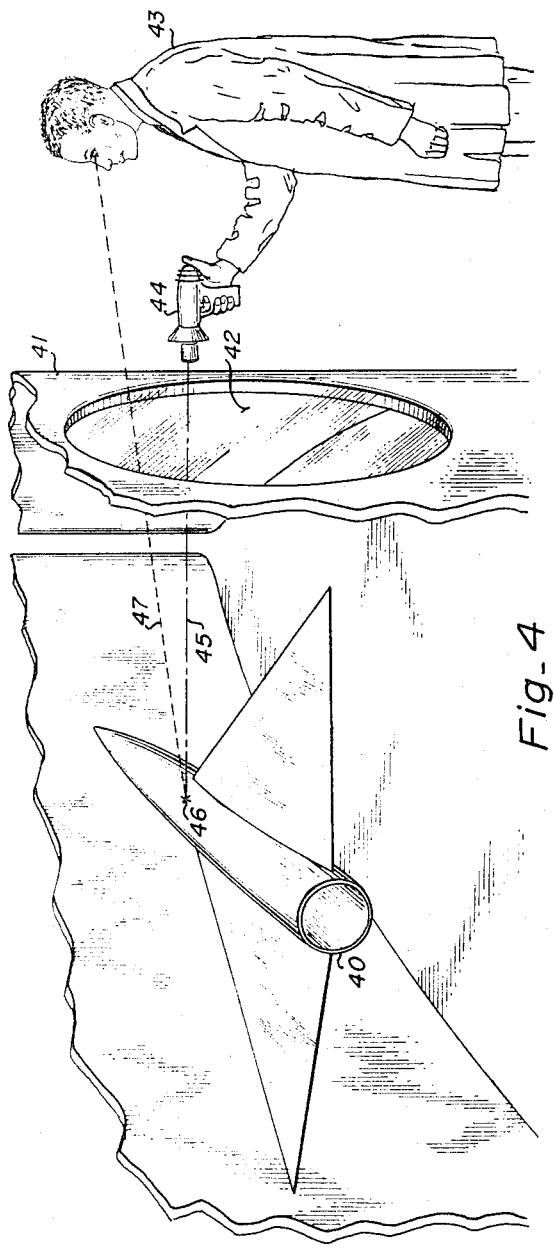
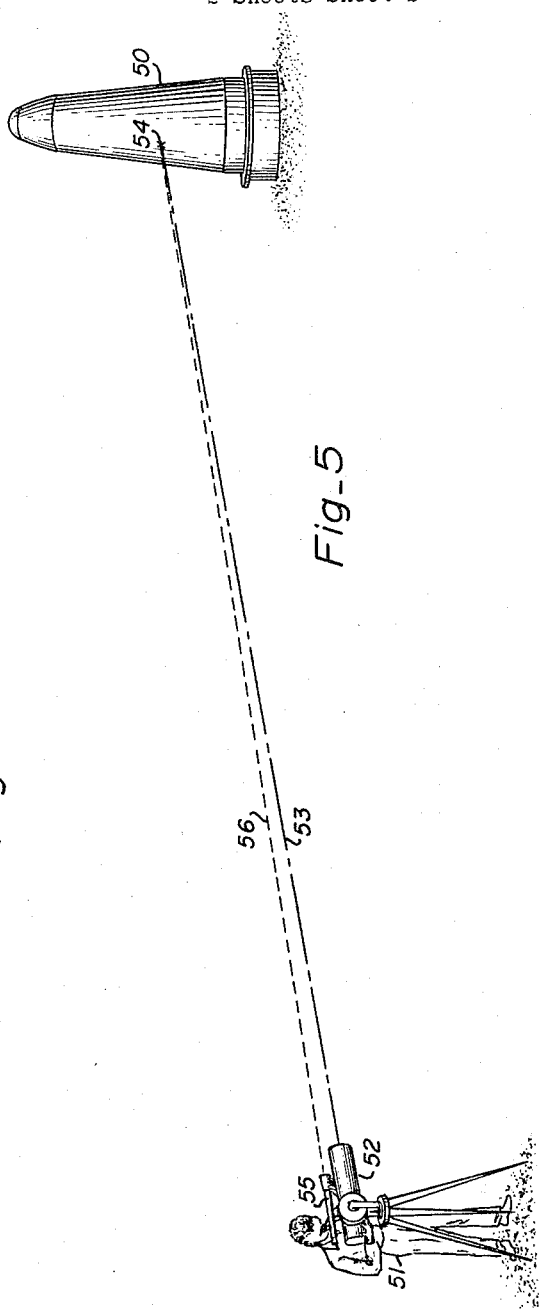

United States Patent Office 3,355,934
Patented Dec. 5, 1967

3,355,934
VIBRATION MEASUREMENT WITH COHERENT LIGHT
John V. Foster, 485 Arboleda Drive, Los Altos, Calif. 94022
Filed Apr. 24, 1967, Ser. No. 634,065
8 Claims. (Cl. 73—71.3)

ABSTRACT OF THE DISCLOSURE

A method for measuring the vibrations of a selected pin point area of an object by projecting a narrow, pencil-like beam of visible coherent light against the object and by visually directing the beam to the selected pin point area. The portion of the light beam reflected from the selected pin point area is received and analyzed to measure the vibration, if any.

The invention described herein may be manufactured and used by or for the Government of the United States of America for governmental purposes without the payment of any royalties thereon on therefor.

This is a continuation-in-part of application Serial No. 378,082, filed June 25, 1964, now abandoned.

BACKGROUND OF THE INVENTION

Field of the invention

This invention relates to the detection and measurement of vibration by the use of wave energy, and more particularly to the detection and measurement of vibration by the use of wave energy in the form of coherent visible light.

Description of the prior art

In various fields of modern technology, vibration problems are extremely important and troublesome. Existing apparatus is not suitable for solving all of the problems of detecting and measuring vibration, particularly when it is desired to determine the vibration of pin point areas. Accordingly, the purpose of this invention is to provide an improved method and apparatus for detecting and measuring vibration under conditions where prior systems were unsuccessful.

For example, it is often necessary or at least desirable to measure vibration without placing any element of the measuring system in contact with the structure under test. One reason is that in some cases, such as a rocket engine on count down, the structure under test will be destroyed or lost, with the resultant loss of any test equipment attached thereto. In addition, it is often undesirable to attach vibration equipment to the test structure because of resultant change in action of the test strucure or because the ambient conditions prevailing at the surface of the structure under test would be damaging to conventional vibration measuring equipment which is attached to the test structure.

Accordingly, a specific object of the invention is to provide a method and apparatus for measuring vibration without placing any apparatus in contact with the structure to be tested.

A further specific object of the invention is to provide a method and apparatus for measuring vibration of a very localized area of a structure under examination.

Another object of the invention is to provide a method and apparatus for permitting vibration measurements to be made over large areas of structures in a very short time and at the same time having the capability of distinguishing the amount of vibration at any localized area from the amount of vibration at other areas in order to pin-point areas of excessive or unexpected vibration.

An additional object of the invention is to provide a method and apparatus for measuring vibrations having a wide range of amplitude.

An additional object of the invention is to provide a method and apparatus for measuring vibration from a position spaced a great distance from the test structure where necessary for safety or other reasons. A related object is to achieve the feature of measurement from a distance without sacrificing any of the other features of the invention as set forth in the preceding objects.

A still further object of the invention is to provide a method whereby the localized (pin point) area under investigation may be visually identified as the area actually under investigation, and, in the alternative, to provide a method which allows a visual selection of any localized area for vibration investigation.

SUMMARY OF THE INVENTION

By way of brief description the preceding objects are achieved by the use of a source of visible coherent light. The term coherent light as used throughout the specification and claims defines visible light in the form of a beam having a wave front in which the light waves are substantially all in phase. For example, the light from a conventional laser is coherent light. As is now well known in the art, the term laser stands for light amplification by stimulated emission of radiation. According to the method and apparatus of the invention, a beam of visible coherent light is projected against the surface of the structure under observation and visually directed to a selected pin point area which is to be placed under investigation. The light which is reflected from the observed structure is received and analyzed to measure the vibration, if any, of the surface under observation.

BRIEF DESCRIPTION OF THE DRAWINGS

Other and further objects and features of advantage will be apparent to those skilled in the art from the following detailed description wherein reference is made to the accompanying drawings, in which:

FIGURE 1 is a schematic view showing one method and arrangement of apparatus for measuring vibration;

FIGURE 2 is a schematic view showing a second embodiment of the invention for measuring vibration;

FIGURE 3 is a schematic view showing a third embodiment of the invention;

FIGURE 4 is a perspective illustrative view of an operator practicing the method of this invention by projecting the beam from a handheld laser through the window in a wind tunnel against a selected pin point area on the surface of a missile under test; and FIGURE 5 is a perspective illustrative view of an operator practicing the method of this invention by projecting the beam of a tripod supported laser against a missile of a launching pad and visually directing the laser beam by aid of a telescope against a selected pin point area.

DESCRIPTION OF THE PREFERRED EMBODIMENT

Referring in more detail to the drawings, FIG. 1 shows a conventional laser 1 mounted, for example, on a support such as the tripod 2. The laser is necessarily of the continuous output variety such as the helium-neon gas lasers which are currently available. The laser is actuated and modulated by a conventional electronic system schematically designated by the box 3 and connected to the laser by a line 4.

An suitable type of modulation can be employed. For example, the constant frequency light generated by the laser can be amplitude modulated, frequency modulated or phase modulated. Conventional apparatus now exists and can be employed to obtain the modulation. Regardless of type of modulation, an important point is that the modulating frequency be selected to have a wavelength which is longer than the maximum amplitude of the vibration to be measured if the demodulator is to avoid ambiguity in its measurement, as will be hereinafter explained in more detail.

The laser 1 as energized by the operating system 3 projects a beam 5 of modulated coherent light against the surface to be observed such as a rocket 6. The light is reflected to form a beam 7 of reflected light which is received by a photo detector 8. The photo detector can be in the form of a conventional photo tube which generates electrical signals when stimulated by light. Photo detector 8 is positioned by any suitable means such as an adjustable helical metal cable 9 to receive the reflected beam 7.

The electrical output from the photo detector 8 is connected by a line in cable 9 to a demodulator 10 which is connected to modulator 3 by a line 11. The demodulator 10 is conventional electronic apparatus which compares the detected signal received by photo detector 8 with the reference modulation signal fed into the laser and provides an output proportional to the difference, if any, between the two signals, as will be hereinafter explained in more detail. The output of demodulator 10 is fed by a line 12 to a conventional recorder 13 to provide a time history of the vibrations of the surface of the rocket 6 during the period it was observed. Alternatively or in addition to the recorder, the output of the demodulator can be connected to conventional visual indicating means such as an oscilloscope.

The apparatus of FIG. 1 operates in the following way. The modulated beam 5 from the laser is projected against an area of interest on the surface of the rocket 6. The light is reflected to form the reflected beam 7 which is received by the photo detector 8. If the surface on which the beam 5 is projected does not have any vibration component along the line of beam 5, the distance traveled by the light from the laser to the photo detector 8 will remain constant. As a result, the phase relation of the modulation frequency of the beam generated by the laser and the modulation frequency of the beam received by the photo detector will remain constant. However, if the surface on which the beam strikes does vibrate along the line of the beam 5, the length of the light path from the laser to the photo detector will alternately lengthen and shorten. As a result, the phase of the reflected beam 7 at the point of reception by detector 8 will vary when compared to the reference modulation signal fed to the laser by modulator 3. The resulting phase variation is discriminated by demodulator 10, and the resulting signal is proportional to the displacement of the vibrating surface.

As previously mentioned, the modulation frequency is selected to have a wave length which is longer than the total forward and back amplitude of vibration which is anticipated. The reason is that if the amplitude of vibration exceeds the wave length it will give a false reading at the demodulator. For example, if the amplitude of vibration in the line of the beam 5 were greater than one wave length it would be impossible to distinguish between large and small vibration. More specifically, a vibration displacement of ¼ wave length would create the same demodulated signal as a displacement of 1¼ wave length.

It is also desirable that the wave length of the modulating frequency not be excessively larger than the expected amplitude of vibration. If the amplitude of vibration is only a minute fraction of the wave length it will not be possible to measure the amplitude of vibration with sharp definition. For example, it would not be desirable to measure amplitudes in the order of angstroms with a wave length in the order of inches. Thus, when it is desired to measure vibration having very small amplitude it is necessary to use very short wave lengths. However, combinations of long and short waves can be used together, with the short wave lengths to give precision on small motions and the longer wave lengths used to resolve ambiguity when the motion exceeds the range of the short wave lengths. FIG. 2 discloses an embodiment of the invention which is particularly adapted for measurement of very small amplitude of vibration. FIG. 2 employs an unmodulated laser 1' which projects an unmodulated beam 5' against the rocket 6. The light is reflected to form a beam 7' which is received by a photo detector 8. The apparatus of FIG. 2 further comprises two partially transparent mirrors 16 and 17. Mirror 16 is positioned across the projected beam 5' and the mirror 17 is positioned across the reflected beam 7'. The angular orientation of the mirrors is such that the beam 18 (shown in dotted lines) is reflected from mirror 16 so as to strike mirror 17 and be reflected therefrom along a path which is coaxial with the path of beam 7' which passes through mirror 17.

The operation of the apparatus shown in FIG. 2 is as follows. Laser 1' generates a coherent beam 5' in conventional manner. The beam is inherently a high frequency short wave length beam as is well known by those skilled in the art. For example, gas lasers are now available which will provide beams having a wave length of 6328 angstroms (visible red light). In any event, the beam from laser 1' has a constant frequency. Part of the beam passes through mirror 16 and is reflected from the rocket 6 and thereafter passes through mirror 17. Another portion of the beam from the laser is reflected by mirror 16 to form the reference beam 18. Beam 18 is reflected by mirror 17 to strike the photo detector 8 as does the reflected beam 7'. Preferably the magnitude of the light in beam 18 should be approximately the same as the light in beam 7'. The two beams 18 and 7' optically add at the detector 8. The condition of motion of the rocket 6 will then determine the phase relation between the adding beams. More specifically, if rocket 6 is not vibrating the phase relation between beams 18 and 7' will remain constant and therefore the output from photo detector 8 will be constant. However, if the rocket 6 moves the phase of beam 7' will be shifted with respect to the phase of beam 18. More specifically, the phase of beam 7' will be shifted so that it either reinforces beam 18 or cancels beam 18. As is well known by those skilled in the field of wave energy, the phase of beam 7' reflected when rocket 6 is vibrating will shift relative to the phase of beam 18 and can be completely in-phase, completely out-of-phase (½ wave length out-of-phase), or can have some in-between phase relation to the control beam 18. If the beams are in-phase they will add to form a bright light at the detector; if completely out-of-phase they will cancel to cause substantially no light; and if at some intermediate phase they will cause some intermediate light. Thus, the detector output will vary as the rocket 6 vibrates back and forth. These output variations can be transmitted over a line 19 to conventional electronic apparatus (not shown) which will convert them to usable form, and as in the case of FIG. 1 the output can be recorded.

FIG. 3 discloses a further embodiment of the invention. The apparatus of FIG. 3 comprises a laser 2 which can project either a modulated beam like laser 1 or an unmodulated beam like laser 1'. The beam projected from laser 2 is designated 5'' and the reflected beam is designated 7''. The reflected beams strike a photo detector and discriminator 22 which is capable of detecting wave change in an impinging light beam 7'' without requiring reference to the wave of the beam projected from the laser. Also, detector-discriminator 22 can be used to put out a signal as the detected light frequency varies (similar to a standard FM discriminator) and thus measure velocity of motion of the device under study since the relative velocity of the object under test, in effect, causes a Doppler shift in the light frequency as seen by the detector.

FIG. 4 illustrates one way in which the present invention may be practiced. As there shown, an object such as a missile 40 is disposed in a wind tunnel 41 which has an observation window 42. An operator 43 with a handheld laser transmitter-receiver 44 (i.e., a laser incorporating the photo detector) directs the laser beam 45 against missile 40 and visually directs the beam, by observing the light spot caused by reflection, to one or more selected pin point areas such as 46 for measuring the vibration of that area. The operator's visual line of sight is shown by dotted line 47.

FIG. 5 illustrates another way in which the present invention may be practiced. As there shown, an object such as a missile 50 is located on its launching pad preparatory to firing. An operator 51 with a tripod mounted laser transmitter-receiver 52, and located a safe distance from the landing pad, directs the laser beam 53 against missile 50. To assist operator 51 in directing laser beam 53 against selected pin point areas, such as 54, a telescope 55 is mounted on laser 52 to allow visual observation of the visual light spot on missile 50. The operator's visual line of sight through the telescope is shown by dotted line 56.

Both the methods illustrated in FIGS. 4 and 5 are exemplary, and it is to be understood that laser spots on distant objects may be observed through a handheld laser having mounted thereon some optics such as a telescope, and that the laser spot on nearby objects may be formed by tripod mounted lasers and may be directly observed.

It should now be apparent that the methods and apparatus described herein are uniquely capable of achieving the objects of the invention. Thus, it is not necessary to place any element of the system in contact with the structure under test. Tests may be made on very localized small areas. This is made possible by the fact that a coherent light beam is inherently a very columnar light beam which can be made to have a very small diameter which is substantially nondiverging. On the other hand, large areas can be tested very quickly by simply moving the light beam from one position to another across the surface to be detected. In addition, it is possible to measure vibrations having a wide range of amplitude. The extremely small wave length of light makes it possible to measure extremely small amplitude of vibration. The ability to modulate the inherently short wave length light beam with a modulating frequency of selectively longer wave length makes it possible to measure with great accuracy amplitudes of vibration over almost any desired range. In addition it is obviously possible to make the measurements at a great distance from the structure being measured.

Although preferred embodiments of the present invention are shown and described herein, it is to be understood that modifications may be made therein without departing from the spirit and scope of the invention as set forth in the appended claims.

Having thus described the invention, what is claimed as new and desired to be secured by Letters Patent is:

1. A method of measuring the vibration of a selected pin point area of the surface of a stationary object comprising the steps of:
    forming and optically focussing a narrow beam of visible coherent light;
    projecting said beam against said surface and visually directing said projected beam to said selected pin point area by visually observing the light spot formed on said surface by said projected beam; and
    comparing said projected beam with the beam reflected from said selected pin point area.

2. A method as claimed in claim 1 wherein said comparison is recorded to show the time history of the vibrations of said surface.

3. A method of measuring the vibration of a selected pin point area of the surface of a stationary object comprising the steps of:
    forming and optically focussing a narrow beam of visible coherent light;
    projecting a portion of said beam against said surface and visually directing said projected beam portion to said selected pin point area by visually observing the light spot formed on said surface by said projected beam;
    reflecting another portion of said beam to mix with the portion of the beam reflected from said selected pin point area; and
    detecting the mixed light beam.

4. A method of measuring the vibration of a selected pin point area of the surface of a stationary object comprising the steps of:
    forming and optically focussing a narrow beam of visible coherent light;
    projecting said beam against said surface and visually directing said projected beam to said selected pin point area by visually observing the light spot formed on said surface by said projected beam; and
    receiving the beam reflected from said selected pin point area with a discriminator which will detect changes in the reflected beam caused by the vibrations of said selected pin point area.

5. A method of measuring the vibration of a selected pin point area of the surface of a stationary object comprising the steps of:
    forming and optically focussing a narrow beam of modulated visible coherent light;
    projecting said modulated beam against said surface and visually directing said projected beam to said selected pin point area by visually observing the light spot formed on said surface by said projected beam;
    receiving the beam reflected from said selected pin point area; and
    comparing the phase of said projected beam with the phase of said reflected beam.

6. A method as claimed in claim 5 wherein the phase change is recorded to show the time history of the vibrations of said surface.

7. A method as claimed in claim 5 wherein the frequency of modulation of said modulated beam has a wavelength which is longer than the amplitude of the component of vibration of said surface along the axis of said beam.

8. A method of measuring the vibration of a selected pin point area of the surface of a stationary body comprising the steps of:
    forming and optically focussing a narrow beam of visible coherent light;
    projecting said beam against said surface and visually directing said projected beam to said selected pin point area by visually observing the light spot formed on said surface by said projected beam;
    receiving the beam reflected from said selected pin point area; and detecting the Doppler shift in the light frequency of said reflected beam as caused by the motion of said selected pin point area.

References Cited

UNITED STATES PATENTS

| | | | |
|---|---|---|---|
| 2,418,538 | 4/1947 | Yetter | 73—67.7 XR |
| 2,733,597 | 2/1956 | Hardy | 73—69 XR |
| 2,913,700 | 11/1959 | Brody | 340—1 |
| 2,964,990 | 12/1960 | Pocher | 88—1 |
| 2,966,090 | 12/1960 | Scholdstrom | 88—1 |
| 3,150,363 | 9/1964 | Finvold | 331—94.5 XR |

OTHER REFERENCES

Ellis, Cecil B. et al., Optical Masers in Space Navigation, vol. 8, No. 3. Autumn 1961 (pp. 206, 209, 210).

680 Tracker, Remote Measurement of Vibration Motion, Displacement, May 1, 1962, cover page 1 and pages 2–5.

RICHARD C. QUEISSER, *Primary Examiner.*

JOHN P. BEAUCHAMP, JR., *Assistant Examiner.*